United States Patent [19]

Weber

[11] Patent Number: 5,099,868
[45] Date of Patent: Mar. 31, 1992

[54] METHOD AND APPARATUS FOR REPLACING UTILITY OUTLETS

[76] Inventor: James D. Weber, 5 Schmidt La., Clark, N.J. 07066

[21] Appl. No.: 646,144

[22] Filed: Jan. 25, 1991

[51] Int. Cl.⁵ .................. F16L 55/12; F16K 43/00
[52] U.S. Cl. .................................... 137/15; 137/315; 137/319; 138/89; 138/94; 138/97
[58] Field of Search .............. 137/15, 315, 317, 318, 137/319, 320, 321, 322; 138/89, 94, 94.3, 97

[56] References Cited

U.S. PATENT DOCUMENTS

| | | | |
|---|---|---|---|
| 2,108,068 | 2/1938 | Larry | 138/94 |
| 2,272,734 | 2/1942 | Witt | 138/94 |
| 2,763,282 | 9/1956 | Reedy et al. | 138/94 |
| 2,899,983 | 8/1959 | Farris | 138/94 |
| 3,091,260 | 5/1963 | Milanovits et al. | 138/94 |
| 3,115,163 | 12/1963 | Van Epps et al. | 138/94 |
| 4,127,141 | 11/1978 | Ledonne et al. | 137/318 |
| 4,239,055 | 12/1980 | Van Coffman | 137/315 |

*Primary Examiner*—George L. Walton
*Attorney, Agent, or Firm*—Rohm & Monsanto

[57] ABSTRACT

A concentrically multi-shafted apparatus compresses a compressible stopper to effect a seal in a through-hole of a main utility line to permit a substantially leak-free removal and replacement of a service saddle or a service seal. Counter rotation of concentric shafts, depending upon the direction of rotation, increases or decreases an axial load on the compressible stopper. The external concentric shaft is in sealing engagement with a housing which, when coupled to a utility customer's gate valve permits a main line through-hole to be sealed by the compressible stopper without leakage of water or gas. Once the through-hole is sealed, the service saddle can easily be removed and replaced.

10 Claims, 2 Drawing Sheets

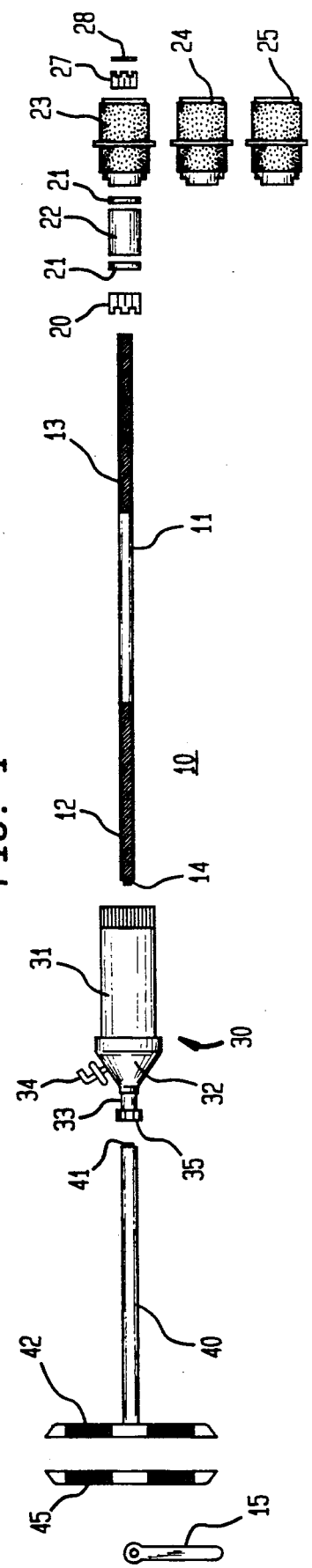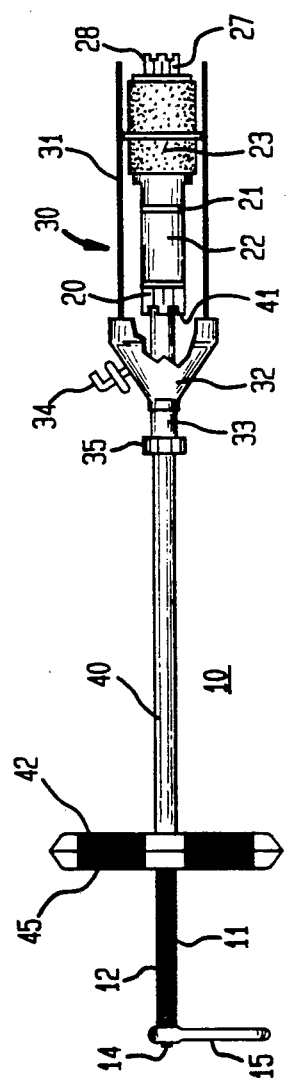

METHOD AND APPARATUS FOR REPLACING UTILITY OUTLETS

BACKGROUND OF THE INVENTION

This invention relates generally to tools and devices for repairing utility supply lines, and more particularly, to an arrangement which facilitates removal of damaged or defective service saddles or service seals.

Service connections to utility supply lines generally are performed to using a hole in the wall of the utility supply pipe which subsequently is covered by a service saddle or a seal. In essence, the saddle is bolted with four or more bolts, or the equivalent thereof, to the exterior of the pipe so as to surround the outlet hole. The communication between the service saddle and the supply pipe is in the form of a seal, such that the fluid supplied from the hole in the wall of the supply pipe is directed to a threaded opening in the saddle or service seal. In many installations, a pipe nipple with a valve coupled thereto is installed to the saddle. The valve generally serves to control the supply of the fluid, which may be a liquid or a gas, to the customer.

Often times, the seal which is interposed between the pipe and the saddle deteriorate or are otherwise damaged, resulting in a leak of dangerous materials, such as natural gas. A conventional approach to stopping the leak is to encase the entire section of pipe with the saddle or seal affixed thereto in an epoxy or similar material. The fitting thus encased is leak proof, but cannot be reused. Thus, not only is this sealing process expensive in and of itself, it will require rerouting of the customer's supply pipe to a new location on the supply line, as well as the making of a hole in the wall of the pipe.

There is, therefore, a need for an apparatus which facilitates removal and replacement of service saddles and service seals.

It is, therefore, an object of this invention to provide a simple and economical system for removing and replacing service saddles and service seals on utilities supply lines.

It is another object of this invention to provide a system for closing a hole in the wall of a utility supply line, without permitting the fluid being supplied to escape.

It is also an object of this invention to provide a system for replacing utility supply line saddles and service seals which avoids the need for rerouting the customer's line.

It is a further object of this invention to provide a simple and economical system for facilitating removal and replacement of utility saddles and service seals in a short period of time, without requiring curing of epoxies or other potting materials.

It is additionally an object of this invention to provide a system for repairing leaks at utility saddles or service seals, without requiring the expense associated with single-use potting or casting jackets.

It is yet a further object of this invention to provide a system by which service seals in a wide range of sizes can be repaired or replaced easily without requiring the repair crew to maintain an inventory of expensive, consumable casting forms.

It is also another object of this invention to provide an apparatus for facilitating repair or replacement of a utility service saddle, wherein all components of the apparatus are recoverable for further use, and no parts thereof are sacrificed.

SUMMARY OF THE INVENTION

The foregoing and other objects are achieved by this invention which provides, in an apparatus aspect thereof, a device which facilitates replacement of a service saddle, or a service seal, which has been installed over a through-hole in the wall of a pipe, such as a main utility line. The service saddle preferably is coupled to a first end of a valve, such as a gate valve, having opened and closed positions. In accordance with the invention, a shaft has a first end which is inserted into the through-hole in the wall of the pipe. An expandable plug is provided for expanding in a radial direction upon the application of an axial load which compresses the plug. The expandable plug has an axial opening therein for accommodating the first end of the shaft. The compression force which constitutes the axial load is applied by a compression drive arrangement which is installed on the shaft and is translatable there along. The apparatus is further provided with a housing which has a first end for coupling to the utility valve, and a second end for sealingly accommodating the compression drive arrangement.

In one embodiment of the invention, the compression drive arrangement is provided with a retention system which maintains the compression force applied to the expandable plug, and a retention driver arrangement for urging the retention system to compress the expandable plug. The retention driver arrangement is removably installed on the shaft. In this embodiment, the first end of the shaft has a threaded portion, and the retention system is threadedly engaged therewith. The retention driver has a first end which couples with the retention system for applying a rotative force thereto. The application of the rotative force results in translation of the retention system along the shaft.

In a further embodiment, there is provided a retention drive securing arrangement for urging the retention driver into engagement with the retention system.

The communication between the retention driver and the housing is fluid-tight in nature, yet permits axial and rotational movement there between. In a specific illustrative embodiment of the invention, the fluid-tight seal is achieved by means of a compression fitting, the loading on which being adjustable, in a known manner. In addition, the communication between the shaft and the retention driver is also fluid-tight in nature. Such a seal may be formed in any of several known ways, including the use of O-rings.

In a preferred embodiment, the housing is provided with a purge valve. This valve facilitates communication between the interior of the housing and the ambient environment, and is useful in determining whether the expandable plug has achieved a seal with the through-hole in the wall of the utility line.

In accordance with a further apparatus aspect of the invention, an arrangement is provided for facilitating replacement of a service saddle or a service seal installed over a through-hole in the wall of a pipe. Preferably, the service saddle or service seal is coupled to a first end of a valve which has open and close positions. The apparatus is provided with a shaft for insertion into the through-hole, the shaft having a first predetermined length and first and second ends. Portions of the first and second ends are threaded. An expandable plug for expanding in a radial direction upon application of an axial compression force is installed on the first end of the shaft via an axial opening there through which accommodates the shaft. A compression retention system is threadedly installed on the first end of the shaft for applying a compression force to the expandable plug in the axial direction. A retention driver is coaxially arranged with respect to the shaft for rotatably driving the compression retention system and thereby applying and removing the compression force. Additionally, a housing is provided having a first end for coupling to a second end of the valve, and a first end for engaging sealingly with the compression drive means.

In accordance with a specific embodiment of the invention, a retainer is threadedly installed on the second end of the shaft for urging the retention driver into engagement with the compression retention arrangement. Thus, the retention driver urges the compression retention system axially along the shaft to control the magnitude of the axial load placed on the expandable plug. The end of the plug opposite the compression retention system is provided with a plug retainer fixedly installed on the shaft.

In accordance a method aspect of the invention, a method of removing and replacing a service saddle for a utility supply line, wherein the service saddle is of the type having an outlet arranged to overlie an outlet hole in wall of the utility supply line, and further being provided with a valve coupled to the outlet of the service saddle, includes the following steps:

coupling a sealed housing member to an outlet of the valve where the valve is in a closed state;

inserting an expandable plug assembly which is in sealing communication with the housing member through the interior of the valve while it is in an open state until the expandable plug is disposed in the vicinity of the outlet hole in wall of the utility supply line;

manipulating a compression driver for applying an axial compressive force to the expandable plug to cause same to expand radially until the outlet hole in the wall of the utility supply line is plugged; and removing the sealed housing member while leaving the expandable plug in sealing communication with the outlet hole in the wall of the utility supply line.

In accordance with a specific embodiment of this method aspect of the invention, the step of manipulating is performed from the exterior of the sealed housing member.

In a further embodiment, the expandable plug assembly is provided with a shaft which is coaxially arranged with the compression driver and extends to the exterior of the sealed housing member, and there is further provided the step of further manipulating the shaft between the step of manipulating the compression driver. Preferably, such manipulation includes the rotation of the compression driver with respect to the shaft and of the sealed housing member.

In the practice of the invention, the step of removing the sealed housing member while leaving the expandable plug in sealing communication with the outlet hole further includes the step of removing the compression driver. Thus, only the shaft, the expandable plug, and its associated compression force retention arrangement would remain after removal of the housing and the retention driver.

BRIEF DESCRIPTION OF THE DRAWING

Comprehension of the invention is facilitated by reading the following detailed description in conjunction with the annexed drawings, in which:

FIG. 1 is a plan view, in exploded form, of a specific illustrative embodiment of the invention;

FIG. 2 is a partially fragmented plan view of the embodiment of FIG. 1 after being assembled;

DETAILED DESCRIPTION

Figure 3:
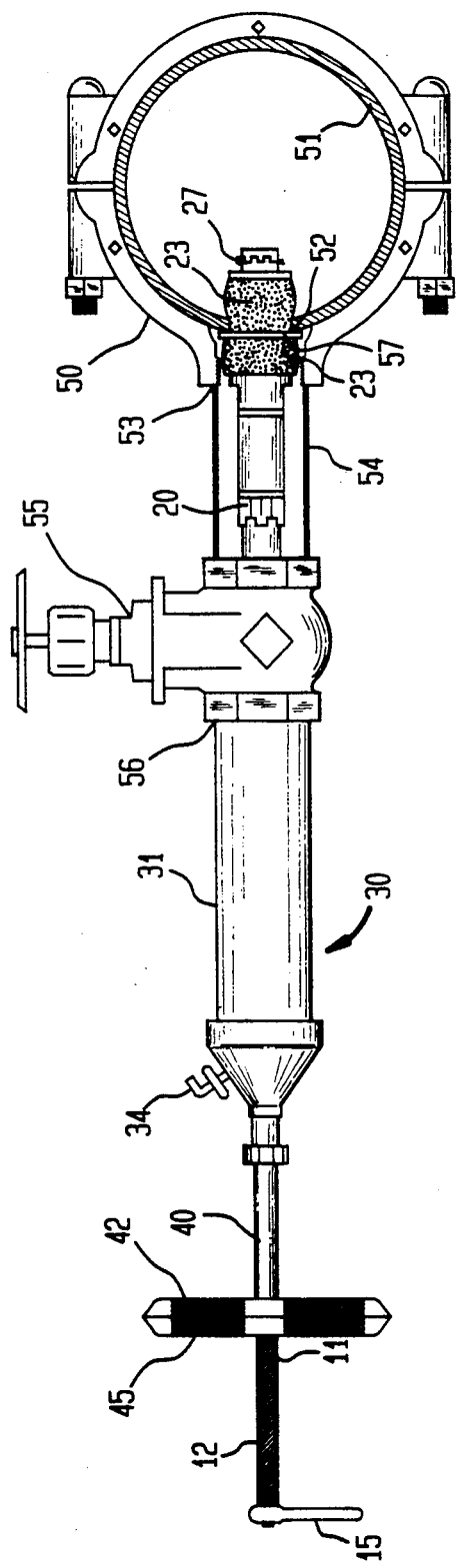
FIG. 3 is a plan view of the embodiment of FIG. 1 of the invention installed through a service valve wherein a through-hole in the wall of a utility main line has been plugged.

FIG. 1 is a partially exploded representation of a stopper system 10 constructed in accordance with the principles of the invention. The stopper system is provided with a shaft 11 which, in this embodiment, has a threaded portion 12 and a further threaded portion 13. Threaded portion 12 is terminated with a square end 14. As will be discussed hereinbelow, square end 14 is configured to engage with a wrench 15.

In this specific illustrative embodiment of the invention, threaded portion 13 of shaft 11 is arranged to couple threadedly with a spline nut 20, and concentrically with washers 21, a cylindrical spacer 22, and a compressible stopper 23. The washers, spacer, and compressible stopper are prevented from sliding off of shaft 11 by a locking arrangement which, in this specific illustrative embodiment, takes the form of a grooved nut 27 and a cotter pin 28.

It is a feature of this invention that the stopper system can readily be adapted to accommodate various sizes of through-holes in the wall of the main utility pipe. Thus, for example, compressible stopper 23 may be used, for sake of illustration, for circular through-holes of 1.675 inches. Other stoppers, however, can be employed for other common sizes of through-holes, such as compressible stopper 24 for 1.25 inch through-holes, or compressible stopper 25 for 1 inch through-holes (not drawn to scale). Moreover, practical embodiments of the invention can employ stoppers having diameters up to 5 inches.

FIG. 1 further shows a housing member which is generally designated as 30. Housing member 30 has a first portion 31 which, in this embodiment may be in the form of a pipe nipple, illustratively formed of brass. First portion 31 is sealingly coupled to a reducer 32 which is intermediate of first portion 31 and a second portion 33. In addition, reducer 32 is provided with a purge valve 34 which permits the interior of housing member 30 to communicate with the ambient air. The use of purge valve 34 will be explained below with respect to FIG. 4.

In large embodiments of the invention, such as those mentioned hereinabove where stoppers are used which have diameters of 5 or more inches, first portion 31 may be appropriately dimensioned. Also, a reducer arrangement (not shown) may be used to provide a transition to a significantly larger service saddle or service sleeve. In such an embodiment, a guide member (not shown) may be employed to form a support for the shaft in the interior of the enlarged first portion.

Continuing with the description of FIG. 1, a removable spline sleeve member or compression nut driver 40 is configured to be accommodated within second portion 33 of housing member 30, and, as will be described hereinbelow, be rotatable therewithin while maintaining a fluid-tight seal by operation of a compression fitting 35 installed on the end of second portion 33. In operation, the spline sleeve member is arranged to overlie concentrically shaft 11. In certain embodiments of the invention, a sealing arrangement is provided to ensure a fluid-tight communication between spline sleeve member 40 and shaft 11. Such a sealing arrangement (not shown) may be in the form of an O-ring installed on shaft 11.

Spline sleeve member 40 is provided at one end thereof with a spline end 41 which is configured to couple coaxially with spline nut 20, whereby the application of a rotative force to the spline sleeve member by means of a handle portion 42 will cause the rotative force to be applied to the spline nut. Finally, a threaded handle 45 is configured to couple threadedly with threaded portion 12 of shaft 11.

FIG. 2 is a partially fragmented plan view of the embodiment of FIG. 1 wherein the individual components thereof, described with respect to FIG. 1 have been assembled. As shown, spline sleeve member 40 is arranged within second portion 33, and shaft 11 is concentric within the spline sleeve member. The compressible stopper and its associated spline nut, washers, spacer, groove nut, and cotter pin are installed on the shaft, at threaded portion 13, which is not visible in this figure. The shaft is inserted into spline sleeve member 40 until spline end 41 is engaged with spline nut 20. Subsequently, threaded handle 45 is threaded onto threaded portion 12 of the shaft, to ensure that spline end 41 does not disengage from spline nut 20. At this point, compression fitting 35 may be adjusted to ensure a fluid-tight communication between second portion 33 of the housing member and the exterior of spline sleeve member 40.

FIG. 3 is a partially cross-sectional representation of the specific illustrative embodiment of the invention employed to facilitate repair or removal of a service saddle 50 which is installed on a main utility line 51. Main utility line 51 is shown cross-sectionally, and is provided with a through-hole 52 view which the fluid being provided by the utility service is provided to a customer. Service saddle 50 is of a well-known type, such as Style 80 which is commercially available from Dresser Manufacturing Division of Dresser Industries, Inc., Bradford, Pa. 16701. Service saddle 50 is provided with a threaded outlet 53 which, as is the standard practice is arranged to be in registration with through-hole 52. A pipe nipple 54 couples the service saddle to a gate valve 55 view which the service to the customer is controlled.

In order to use the invention, gate valve 55, which is a part of the utility supply system, is closed, and the customer plumbing (not shown) is removed therefrom, such that a threaded outlet 56 of gate valve 55 is exposed. First portion 31 of housing member 30 is threaded onto the threaded outlet 56 until fluid-tight engagement is made. The gate valve is then opened and spline sleeve member 40 is pushed into the housing member until compressible stopper 23 passes through the gate valve and becomes seated in through-hole 52 of the main utility line. As shown, certain embodiments of compressible stopper 23 are provided with a annular seating ring 57 which will permit the operator (not shown) to determine that the compressible stopper has entered the through-hole. Of course, other techniques can be employed to make this determination, such as by measuring the distance between the end of shaft 11 and the wall of the main utility line. Once it is determined that the compressible stopper is properly seated in the main utility line, the operator will cause the shaft to be rotated with respect to the spline sleeve member. This can be achieved by rotating handles 45 and 42, or wrench 15, such that spline nut 20 is driven toward groove nut 27. This will load the compressible stopper with axial force whereby it becomes deformed to expand radially. Sufficiency of the seal between the compressible stopper and the main utility line is determined by operating purge valve 34. Once no fluid is detected existing open purge valve 34, no further increase in the axial loading of the compressible stopper is required.

After the seal of through-hole 52 is achieved, as described above, threaded handle 45 is removed and the spline sleeve member is retracted so that it is no longer engaged with spline nut 20. Housing member 30 is then uncoupled from gate valve 55, and removed therefrom, such that only shaft 11 and the compressible stopper remain of the stopper system.

Figure 4:
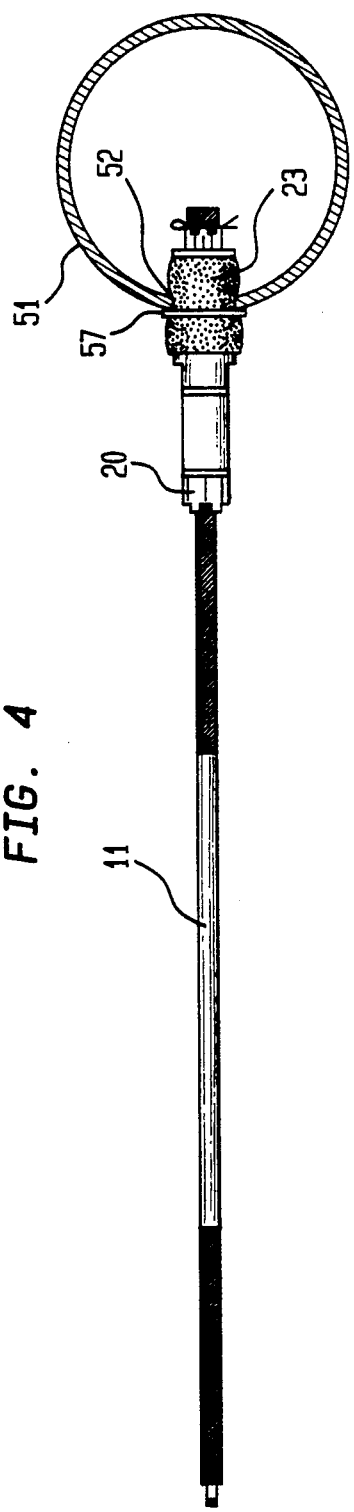
FIG. 4 if a plan view of a portion of the embodiment of FIG. 1 which remains after the defective service saddle has been removed, and prior to installation of a replacement saddle or service seal.

FIG. 4 is a partially cross-section representation of portions of the specific illustrative embodiment of the invention described hereinabove, after gate valve 55, pipe nipple 54, and service saddle 50 had been removed. With through-hole 52 sealed, a new service saddle can be installed, along with a replacement pipe nipple and gate valve if desired. Housing member 30 and spline sleeve member 40 are also installed, and a counter rotation is applied to either spline sleeve member 40 or shaft 11 such that spline nut 20 is driven away from groove nut 27. This relaxes the axial load on compressible stopper 52, whereby it can be withdrawn axially into housing member 30. The gate valve is then closed, the purge valve is opened to see whether the fluid or natural gas has been completely shut down, and then the stopper system is uncoupled therefrom. Thus, the present invention provides a simple, economical, clean, and substantially leak-free operation for removing and replacing a service saddle. The practice in this field of endeavor prior to the present invention would not permit replacement of the saddle, and such would be potted in place and a new customer outlet created at another section of the main utility line.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An apparatus for facilitating replacement of a service saddle installed over a through-hole in a wall of a service pipe, the service saddle being coupled via a pipe nipple to a first end of a valve having open and closed positions, the apparatus comprising:

shaft means having a first end for insertion through the valve while it is in the open position, through the pipe nipple, and into the through-hole in the wall of the service pipe;

fixed end-stop means fixedly installed on said first end of said shaft means so as to be disposed within the service pipe for forming an end-stop;

expandable plug means for expanding in a radial direction upon application of a compression force in an axial direction, said expandable plug means having, when there is no compression force applied, a substantially cylindrical configuration having a first end and a second end, and a diameter which is shorter than that of the through-hole in the wall of the service pipe, said expandable plug means further having an axial opening therethrough for accommodating said shaft means and an annular seating ring arranged intermediate of said first and second ends, and having a diameter which is longer than that of the through-hole in the wall of the service pipe for preventing the entire expandable plug means from entering the through-hole in the wall of the service pipe, said expandable plug means being urged against said end stop means, whereby upon the application of the axial compression force, said expandable plug means seals the through-hole in the wall of the service pipe at the exterior thereof via the annular seating ring which is urged against the exterior of the wall of the service pipe in a region thereof surrounding said through-hole, and at the interior thereof via a bulge formed in the expandable plug means in response to the axial compression force;

compression nut means threadedly installed on said shaft means for applying to said expandable plug means an axial compression force against said fixed end-stop means;

removable compression nut driver means removably installed on said shaft means for applying a rotative force to said compression nut means, said removable compression nut driver means having a first end adapted for removably coupling to said compression nut means and a second end adapted for rotative manipulation; and housing means having a first end for coupling to the second end of the valve, and a second end for sealingly accommodating said compression nut driver means.

2. The apparatus of claim 1 wherein there is further provided compression driver securing means removably arranged on a second end of said shaft means external to the valve for urging said removable compression nut driver means into engagement with said compression nut means.

3. The apparatus of claim 1 wherein there is further provided seal means for forming a fluid-tight seal between said removable compression nut driver means and said housing means, wherein said removable compression nut driver means is movable with respect to said housing means.

4. The apparatus of claim 1 wherein there is further provided purge valve means for facilitating communication between the interior of said housing means and the ambient environment.

5. A method of removing and replacing a service saddle for a utility supply line, the service saddle being of the type having an outlet arranged to overlie an outlet hole in a wall of the utility supply line and having a valve coupled to the outlet of the service saddle, the method comprising the steps of:

coupling a sealed housing member and a removable compression driver tool sealably arranged therewith to an outlet of the valve while the valve is in a closed state;

manipulating the valve so that it achieves an open state;

slidably moving the removable compression driver tool with respect to the housing member while maintaining a seal with respect thereto;

inserting an expandable plug assembly which is in sealing communication with the housing member through the interior of the valve while it is in an open state so that a first portion of the expandable plug assembly enters the outlet hole until an annular seating ring arranged around the expandable plug which has a diameter which is longer than that of the outlet hole communicates with the exterior of the utility supply line in the vicinity of the outlet hole in the wall of the utility supply line;

manipulating with a removable compression driver tool a compression nut for applying an axial compressive force to the expandable plug to cause same to expand radially within the utility supply line and the annular seating ring to be urged against the exterior of the utility supply line in the vicinity of the outlet hole, until the outlet hole in the wall of the utility supply line is sealed by the radial expansion of the first portion of the expandable plug in the interior of the utility supply line, and the annular seating ring on the exterior thereof; and removing the sealed housing member and the removable compression driver tool while leaving the expandable plug in sealing communication with the outlet hole in the wall of the utility supply line.

6. The method of claim 11 wherein said step of manipulating is performed from the exterior of the sealed housing member.

7. The method of claim 5 wherein the expandable plug assembly is provided with a shaft which is coaxially arranged with the removable compression driver tool and extends to the exterior of the sealed housing member, and there is provided the further step of manipulating the shaft during said step of manipulating the removable compression driver tool.

8. The method of claim 7 wherein said step of manipulating the removable compression driver tool comprises the step of rotating the removable compression driver tool with respect to the shaft.

9. The method of claim 7 wherein said step of manipulating the removable compression driver tool comprises the step of rotating the removable compression driver tool with respect to the sealed housing member.

10. The method of claim 5 wherein said step of inserting the expandable plug assembly comprises the step of axially moving the expandable plug assembly while at least a portion thereof is disposed within the removable compression driver tool.

* * * * *